United States Patent
Mizushima et al.

(10) Patent No.: US 8,131,027 B2
(45) Date of Patent: Mar. 6, 2012

(54) FINGER CONTACT DETECTING APPARATUS, FINGER CONTACT DETECTING METHOD, FINGERPRINT READING APPARATUS AND COMPUTER-READABLE RECORDING MEDIUM

(75) Inventors: Satoshi Mizushima, Iizuka (JP); Yoshinori Tahara, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 794 days.

(21) Appl. No.: 12/234,750

(22) Filed: Sep. 22, 2008

(65) Prior Publication Data

US 2009/0087044 A1 Apr. 2, 2009

(30) Foreign Application Priority Data

Sep. 27, 2007 (JP) ................................. 2007-250475

(51) Int. Cl.
*G06K 9/20* (2006.01)
(52) U.S. Cl. ...................................................... 382/124
(58) Field of Classification Search ................... None
See application file for complete search history.

(56) References Cited

U.S. PATENT DOCUMENTS

| 5,598,482 | A | 1/1997 | Balasubramanian et al. | |
| 6,483,932 | B1* | 11/2002 | Martinez et al. | 382/124 |
| 2007/0274575 | A1* | 11/2007 | Russo | 382/124 |

FOREIGN PATENT DOCUMENTS

| JP | 5-344336 A | 12/1993 |
| JP | 2003-507822 A | 2/2003 |
| JP | 2005-202694 | 7/2005 |
| JP | 2006-189948 A | 7/2006 |

OTHER PUBLICATIONS

Japanese Office Action dated Oct. 13, 2009 with partial translation.

* cited by examiner

*Primary Examiner* — Brian Werner
(74) *Attorney, Agent, or Firm* — IPUSA, PLLC

(57) ABSTRACT

A finger contact detecting apparatus, which detects a finger being swept on a fingerprint sensor of the finger contact detecting apparatus, the finger contact detecting apparatus including, a pixel data averaging unit calculating an average value of pixel data collected by the fingerprint sensor; a deviation adding unit calculating, based on the average value and respective pixel data of predetermined pixels obtained by the fingerprint sensor, a summation of deviations of the respective pixel data of the predetermined pixels; and a finger contact detecting unit determining whether the finger is separated from the fingerprint sensor based on the summation of deviations and a predetermined threshold value.

6 Claims, 9 Drawing Sheets

FINGER CONTACT DETECTING APPARATUS, FINGER CONTACT DETECTING METHOD, FINGERPRINT READING APPARATUS AND COMPUTER-READABLE RECORDING MEDIUM

BACKGROUND OF THE INVENTION

1. Field of the Invention

This invention relates to a finger contact detecting apparatus and a finger contact detecting method, a fingerprint reading apparatus, and a fingerprint reading method.

2. Description of the Related Art

A fingerprint reading apparatus including a line sensor with pixels arranged on a line is known. While a finger is swept on the line sensor, light is irradiated onto the finger with a LED (Light Emitting Diode) or the like, and the reflected light from the finger is detected with the line sensor to obtain a line image of the finger. A fingerprint image is then formed (composed) using the line image.

Such a fingerprint reading apparatus obtains a subtraction (difference) between the maximum values of a fingerprint image data measured under LED light radiation and no LED light radiation, and determines whether the finger is separated from the line sensor based on a difference between the subtraction result and a predetermined value.

FIG. 1 and FIG. 2 are drawings to describe a finger contact determination method of a conventional fingerprint reading apparatus. FIG. 1(a) is a side view of a conventional fingerprint reading apparatus measuring a fingerprint image with light radiation from a LED 110. In FIG. 1(a), a finger 150 sweeps from the left side to the right side (indicated by an arrow) on a line sensor 120 provided in a frame 140. The LED 110 radiates light on the finger 150, and the line sensor 120 receives the reflected light through an image guide 130.

FIG. 1(b) indicates an output signal of the line sensor 120 in a state of FIG. 1(a). FIG. 1(b) indicates that the output of the line sensor 120 is varied according to a surface ridge pattern of a fingerprint, and the outputs of pixels indicate a wavelike signal. Further, image data obtained with the line sensor 120 is collected for one frame by one frame at a predetermined periodic cycle while the finger 150 is swept on the line sensor 120. In this case, the maximum value of the pixel outputs is close to 255 in the range of 0 to 255.

FIG. 2(a) shows a side view of a conventional fingerprint reading apparatus measuring a fingerprint image with no light radiation from a LED 110. In FIG. 2(a), the LED 110 is turned off, there in no reflected (or scattered) light incident on the line sensor 120, and the line sensor 120 receives no light.

FIG. 2(b) indicates an output signal of the line sensor 120 in a state of FIG. 2(a). In FIG. 2(b), the output signal of the line sensor 120 indicates that output values of the entire pixels are small showing dark image data for all over. Thus the maximum value of the pixel outputs also indicates a small value.

Further, as shown in FIG. 2(a) and FIG. 2(b), as respective maximum values caused by LED light radiation and no LED light radiation have a difference at a state where the finger 150 is on the line sensor 120, by comparing these values, it is possible to detect whether a finger 150 is on the line sensor 120. In the same manner, a procedure to continuously detect whether the finger is on the line sensor 120 is performed while measuring fingerprint images and applied to obtain a proper fingerprint image.

For a detecting apparatus utilizing such a technique, which detects a detection signal level that varies when a body to be detected contacts a detection part, a detecting apparatus having a detecting unit that detects whether a body to be detected contacts a detection part based on a relationship obtained by comparing a detected signal level and a predetermined base level, is known (for example, a patent document Japanese Patent Application Publication No. 2005-202694).

However, related art devices shown in FIG. 1 and FIG. 2 described above have a problem in that disturbing (background) light radiation causing frequent misdetection that the finger 150 is judged not to be on the line sensor 120 while the finger 150 is actually on the line sensor.

This occurs since background light tends to pass through part of a fingertip of the finger 150 because the fingertip is a thinner part of the finger 150. In this case, the background light reaches the line sensor 120, so that no difference of the output of the line sensor 120 is obtained for the cases between light radiation from the LED 110 and no light radiation. Thus, the determination method described above does not function appropriately.

Also, there is little consideration of the influence for the background light in the patent document 1 mentioned above, and there may be a similar problem causing misdetection under background light that a finger is judged not to be on a line sensor while the finger is actually on the line sensor.

Thus, one aspect of this invention is to provide a finger contact detecting apparatus, a finger contact detecting method, and a fingerprint reading apparatus using the finger contact detecting method, and a fingerprint reading method using the fingerprint reading apparatus which enable to reliable (accurate) detection of whether a finger is separated from the fingerprint sensor.

SUMMARY OF THE INVENTION

According to one aspect of the invention, a finger contact detecting apparatus, which detects a finger being swept on a fingerprint sensor of the finger contact detecting apparatus including, a pixel data averaging unit calculating an average value of pixel data collected by the fingerprint sensor; a deviation adding unit calculating, based on the pixel data average value and respective pixel data of predetermined pixels obtained by the fingerprint sensor, addition (summation) of deviations of the respective pixel data of the predetermined pixels; and a finger contact detecting unit determining whether the finger is separated from the fingerprint sensor based on the addition of deviations and a predetermined threshold value.

Thereby, finger contact detection can be reliably performed, and a fingerprint image can be obtained at the time when the finger separates from the detecting unit.

According to another aspect of the invention, a finger contact detecting method includes the steps of (a) collecting pixel data of a fingerprint sensor while a finger is being swept on the fingerprint sensor; (b) calculating an average value of the pixel data collected by the fingerprint sensor; (c) calculating addition of deviations based on the average value and respective pixel data of predetermined pixels obtained by the fingerprint sensor; and (d) determining whether a finger is separated from the fingerprint sensor based on the obtained addition of deviations at step (c) and a predetermined threshold value.

According to another aspect of the invention, a fingerprint reading apparatus includes: the finger contact detecting apparatus claimed in claim 1; the fingerprint sensor; and an image composing memory that records fingerprint image data collected by the fingerprint sensor and composes a fingerprint image.

According to another aspect of the invention, a computer-readable recording medium having instructions executable by a computer to execute a fingerprint reading method including the steps of collecting fingerprint image data while a finger is being swept on a fingerprint sensor; and performing the finger contact detecting method of claim 5, wherein when the finger is detected as being separated from the fingerprint sensor after executing the step of performing the finger contact detecting method, the step of collecting fingerprint image data is finished.

According to another aspect of the invention, an accurate detection of finger contact can be performed.

Further, reference symbols in parentheses are used for clearly describing embodiments as examples, and this invention is not limited to the drawings.

Other objects, features and advantages of the present invention will become more apparent from the following detailed description when read in conjunction with the accompanying drawings.

BRIEF DESCRIPTION OF THE DRAWINGS

FIG. 1(a) is a side view indicating a state where a fingerprint image is collected while the LED 110 is turned on; FIG. 1(b) indicates output data of the line sensor 120 at the state of FIG. 1(a);

FIG. 2(a) is a side view indicating a state where a fingerprint image is collected while the LED 110 is turned off; FIG. 2(b) indicates output data of the line sensor 120 at the state of FIG. 2(a);

FIG. 4 is an illustration to show an example for a selection of predetermined pixels of a line sensor 20a;

FIG. 8 is an illustration showing a state where the finger 150 is removed from the line sensor 20a;

DETAILED DESCRIPTION OF THE PREFERRED EMBODIMENTS

Referring to figures, preferred embodiments are described in the following.

Figure 1:
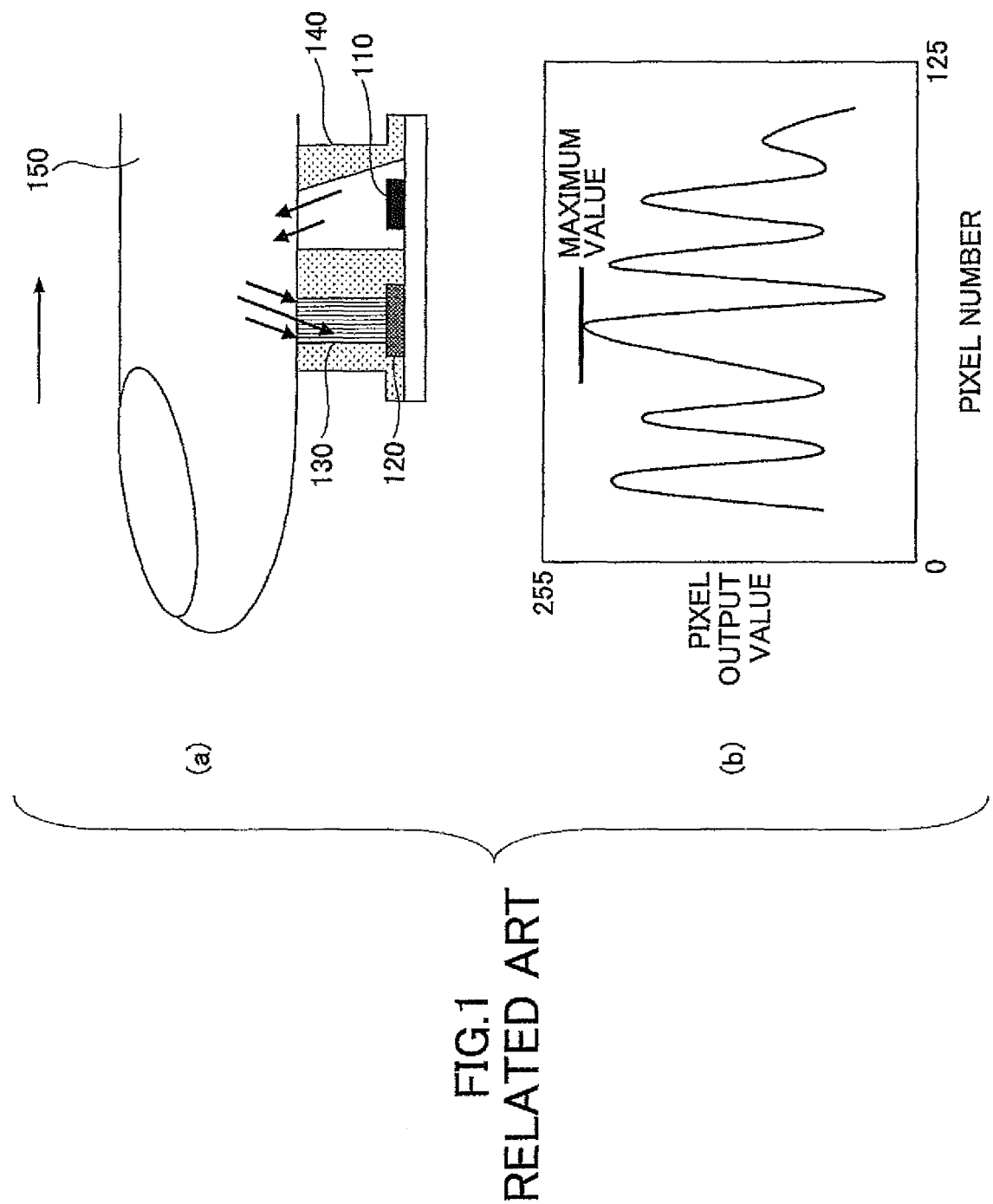
FIG. 1 is a drawing showing an example of a determination method of an occurrence of finger contact for a conventional fingerprint reading apparatus.
Figure 2:
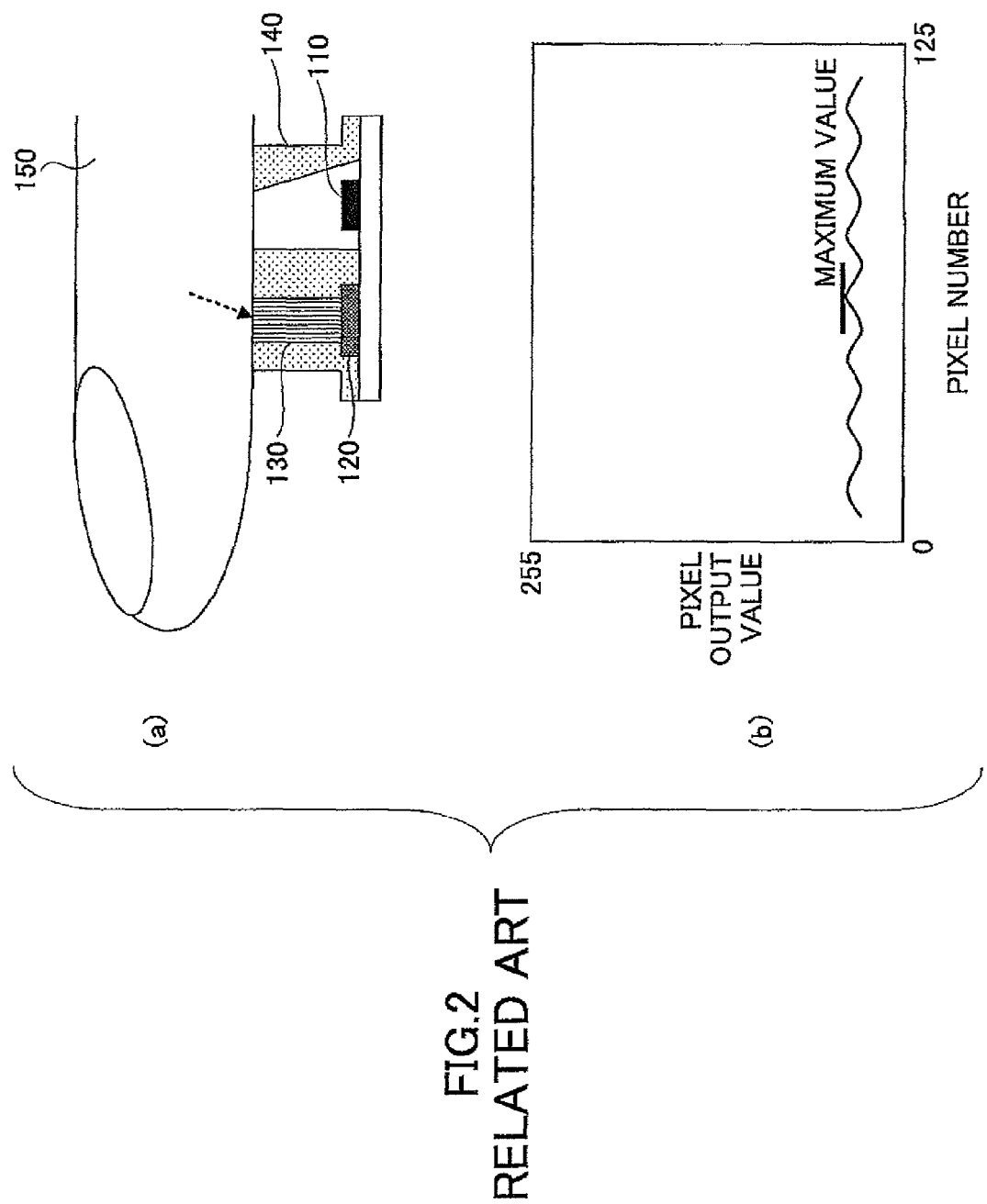
FIG. 2 is a drawing showing an example of a determination method of an occurrence of finger contact for a conventional fingerprint reading apparatus.
Figure 3:
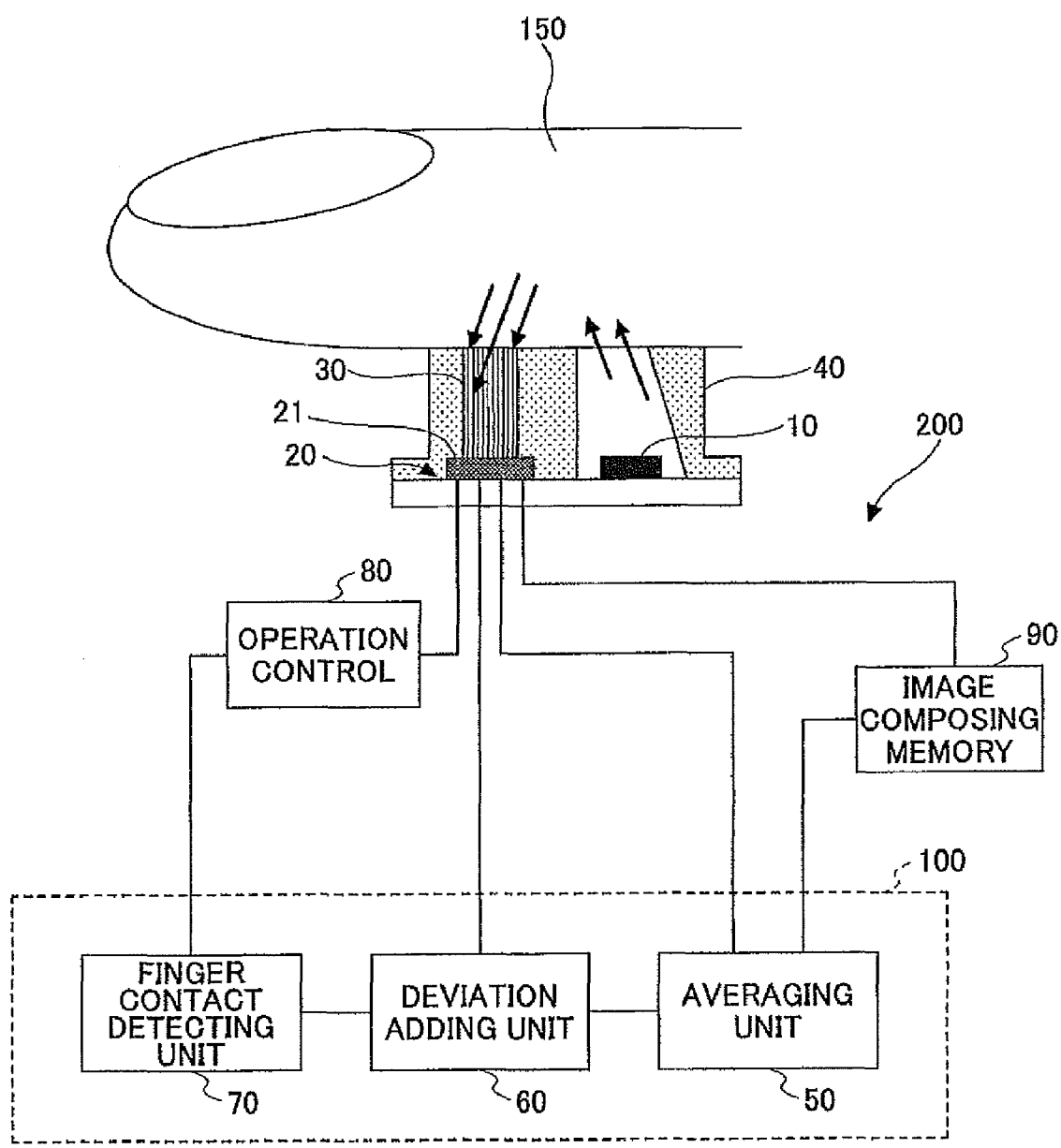
FIG. 3 is a drawing to show a concept of constitution of a finger contact detecting apparatus 100 and a fingerprint reading apparatus 200 of this embodiment.

FIG. 3 is a drawing showing a concept of a constitution of a finger contact detecting apparatus 100 and a fingerprint reading apparatus 200 applying this embodiment. In FIG. 3, the finger contact detecting apparatus 100 includes a pixel data-averaging unit 50 (or an averaging unit 50), a deviation adding unit 60, and a finger contact detecting unit 70. Further, a fingerprint reading apparatus 200 may include a fingerprint sensor 20, an image composing memory 90, a light-emitting unit 10, an image guide 30, a frame 40, and an operation control unit 80 according to necessity.

The light-emitting unit 10 radiates output light to a finger 150. In order to collect a fingerprint image of the finger 150, a ridge pattern of a surface of the fingerprint needs to be read by radiating the output light (of the light-emitting unit 10) to the finger 150 and receiving reflected (or scattered) light from the finger. Under a state where background light is weak, such as an indoor place or an outdoor place having shades or the like, the output light (or light) needs to be generated to radiate the light to the fingerprint surface of the finger 150. The light-emitting unit 10 generates light for radiation and radiates the light on the finger 150.

Any kind of light may be used as the light-emitting unit, for example, a LED (light emitting diode) may be applied. When infrared light is preferred, an infrared LED may be applied. Further, under a condition where background light is strong, so that a fingerprint image can be collected by only the transmitted light of the background light, then the light-emitting unit 10 may be turned off.

The fingerprint sensor 20 is an imaging unit which receives the light from the finger to collect a fingerprint image. The fingerprint sensor 20 is constituted by an imaging element having plural pixels 21 formed by arranged photoelectric conversion elements. An arrangement of the pixels 21 may be configured in a two-dimensional plane with a predetermined shape, and for example, a line sensor having plural pixels 21 arranged in a line may be applied. The line sensor collects, at one time, only line image data constituting part of a fingerprint. However, the line sensor collects the line image data as the finger 150 is swept and the entire fingerprint image can be formed by composing the image data. Further, for a case where the fingerprint sensor 20 is a line sensor, plural line sensors may be included in the finger print sensor 20 instead of one line sensor. Also, any type of photoelectric conversion elements may be applied for the pixels 21, and for example, photodiodes may be applied.

The image guide 30 is a waveguide to guide light (incident light) from the finger 150 onto the fingerprint sensor 20. The image guide 30 is provided to efficiently guide the light from the finger 150 onto the fingerprint sensor 20 when necessary. For example, optical fibers may be applied to the image guide 30.

The frame 40 is a frame unit for mounting the light-emitting unit 10, the fingerprint sensor 20, and the image guide 30. As long as the frame 20 is strong enough to support the finger 150 when the finger 150 is placed on the frame 20, any type of frame (structure) may be used. For example, when the finger contact detecting apparatus 100 or the fingerprint reading apparatus 200 is mounted in a mobile (portable) phone, the frame 20 may be formed as part of the frame unit of the mobile phone.

The averaging unit 50 calculates average values of image data collected by the pixels 21 constituting the fingerprint sensor 20. As pixel data is indicated by an absolute number in response to brightness at the pixel, the averaging unit 50 can calculate an average value of the collected output pixel data. Accordingly, an average value of the whole brightness for a fingerprint image collected by the fingerprint sensor 20 can be known and also an average value can be determined for background light in the surrounding environment. For example, when the fingerprint sensor 20 is a one-dimensional line sensor formed by using 126 pixels arranged in a line, the average value for 126 pixels is calculated. Also, when the fingerprint sensor 20 is formed by four rows of the one-dimensional line sensors arranged in two dimensions, the average value is calculated for 512 pixels of data.

Further, for calculating an average using the averaging unit 50, an arithmetic average for the entire pixels 21 of the fingerprint sensor 20 is preferred. However, when an arithmetic process for the calculation is large, another way where the number of pixels to be calculated for averaging is reduced or a similar way may be applied when necessary. This issue will be described later.

The deviation adding unit 60 calculates, for respective pixel data of predetermined pixels selected from the pixels 21 of the fingerprint sensor 20, a summation (addition) of a deviation that is obtained from an averaged pixel data calculated with the averaging unit and the pixel data of the predetermined pixels. In short, the deviation adding unit 60 calculates, for respective selected pixel data of the predetermined pixels, the absolute value of the difference between each pixel data and the average pixel data or the square root of a squared value of the difference between each pixel data and the average pixel data, and then the obtained values are added. The predetermined pixels to be calculated by the deviation-adding unit 60 for the addition of the deviations may be selected from arbitrary pixels of the fingerprint sensor 20. However, selecting of a proper number of predetermined pixels is preferred for considering the load of an arithmetic process of calculating the addition of the deviations. Also, for the arrangement of the predetermined pixels, the predetermined pixels may be selected from arbitrary positions in the fingerprint sensor 20. However, the arrangement of pixels uniformly distributed over the fingerprint sensor 20 is preferred for the predetermined pixels to reflect pixel data of the whole regions of the fingerprint sensor 20.

Figure 4:
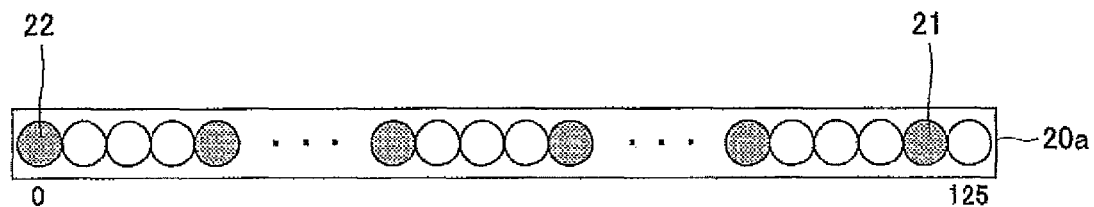

FIG. 4 is an example of selection of predetermined pixels 22 for the pixels 21 arranged in a line sensor 20a applied as the fingerprint sensor 20. In FIG. 4, the fingerprint sensor 20a is a line sensor having 126 (one hundred twenty-six) of the pixels 21 laterally arranged in a line. Also, when each pixel is numbered from the left to the right being 0 (zero) through 125 (one hundred twenty-five), the 0th, the 4th, . . . 4nth (n indicates 0 and positive integers), . . . , the 120th, and the 124th of 22 pixels are selected as the predetermined pixels 22. In this manner, for the line sensor 20a which includes 126 pixels of the pixel 21 being laterally arranged in a line, by determining every 4n-th (n is zero or positive integers) pixel of the pixel 22 as a predetermined pixel of the pixel 22, 32 of 126 pixels of the line sensor 20a are determined as the predetermined pixels, and each of the predetermined pixels is almost uniformly arranged in the line sensor 20a having three pixels apart. Further, by calculating the difference between each pixel data of the predetermined pixels 22 and the average pixel data, a number of predetermined pixels 22 having a large difference increases when the finger 150 exists on the line sensor 20a because of a peak and valley roughness pattern of a fingerprint. For a case where the finger 150 does not exist on the line sensor 20a, a number of predetermined pixels 22 having a small difference increase because a ridge pattern of the fingerprint does not exist. Based on the differences described above, the existence of the finger 150 on the line sensor 20a can be determined.

Further, for the fingerprint sensor 20, any kind of sensors may be applied instead of the line sensor 20a having 126 pixels, and such a sensor can determine the pixels 22 to be calculated as the predetermined pixels 22 for adding deviations over ranges which the deviation adding unit 60 can process. For such determined pixels 22 at plural positions, pixel data and the average pixel data of the fingerprint sensor 20 are calculated, and based on the calculation results, determining whether the finger 150 is on the fingerprint sensor 20 is possible.

Further, adding of deviations calculated with the deviation adding unit 60 may be an addition (summation) of absolute deviations, which differences between each image data of the predetermined pixels 22 and the average image data are obtained respectively and the absolute values of the differences are added. The adding of deviations may also be addition of square deviations, which differences between each image data of the predetermined pixels 22 and the average image data are obtained respectively and each difference is squared, and then all the squared values are added. The difference between the two methods is only in the arithmetic procedure, but from a point of view where using addition (summation) of deviations between the pixel data of the predetermined pixels 22 and the average image data, there is no difference.

Next, other elements of the finger contact detecting apparatus 100 and the fingerprint reading apparatus 200 are described referring to the figures.

The finger contact detecting unit 70 performs an arithmetic process to judge whether the finger 150 is separated from the fingerprint sensor 20 based on the addition of deviations obtained by the deviation adding unit 60. The finger contact detecting unit 70 may include a predetermined threshold value to judge the finger contact in a memory. Further, by comparing between a summation of deviations and the predetermined threshold value, the finger contact detecting unit 70 determines that the finger 150 is separated from the fingerprint sensor 20 when the summation of deviations is smaller than the predetermined threshold value.

Further, in determining the finger contact, to improve the correctness of finger contact detection, the determination that the finger 150 is separated may be made when the summation of deviations of the predetermined pixels 22 indicating a summation less than the predetermined threshold value has continued for more than a predetermined number of lines. As the pixel data of the predetermined pixels 22 are part of sampling data of the finger sensor 20, and the predetermined pixels 22 may possibly correspond to part of a fingerprint including a large flat area for a certain moment, so that accidentally the summation of deviations can be smaller than the predetermined threshold value. Thus, it is preferred to perform an additional arithmetic process to avoid such an occurrence, in which the finger contact is determined as a separation of a finger when a condition that the summation of deviations for pixel data of the predetermined pixels 22 is less than the predetermined threshold value has continued for a predetermined number of lines.

As described above, the constitution elements of the finger contact detecting unit 100, the averaging unit 50 (or the pixel data averaging unit 50), the deviation adding unit 60, and the finger contact detecting unit 70 are all units performing operation of processes, and they may be constituted by a microcomputer operable by software, a specific electronic circuit, or an arithmetic operation unit such as an ASIC (Application Specific Integrated Circuit) device or the like.

The operation control unit 80 is an arithmetic operation unit that manages the whole operation of the fingerprint reading apparatus 200. For example, once the finger contact detecting unit 70 determines that finger separation has occurred, based on the result, the operation control unit 80 performs a process for finishing the operation of the fingerprint sensor 20 detecting a fingerprint. Also, the operation control unit 80 may perform a determining operation that determines whether fingerprint image data obtained by the fingerprint sensor 20 should be recorded as frame data, or performs determining process whether the light-emitting unit 10 should be turned on, or the like.

The image composing memory 90 records pixel data of a fingerprint image collected by the fingerprint sensor 20 as frame data. The fingerprint image collected with the fingerprint sensor 20 is recorded in the image composing memory 90, and eventually the whole image of a fingerprint is composed. As long as a memory is rewritable for image data, that memory may be applied as the image composing memory 90 according to necessity.

Further, for calculating an average value of pixel data using the averaging unit 50, the averaging process may be performed by directly using image data collected with the fingerprint sensor 20 or based on pixel data recorded in the image composing memory 90.

Next, referring to FIG. 5 through FIG. 9, operation examples of operation processes, which are executed by the finger contact detecting apparatus 100 related to this embodiment, are described. In FIG. 5 through FIG. 9, the fingerprint sensor 20 corresponds to the line sensor 20*a* having 126 pixels shown in FIG. 4.

Figure 5:
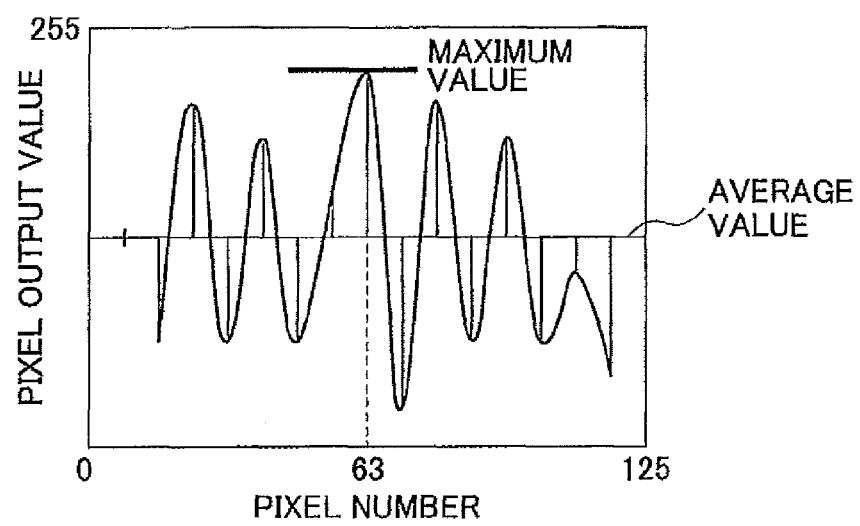
FIG. 5 is an illustration showing output values of the pixels under the state of FIG. 3.

FIG. 5 indicates output values of pixel data collected with the fingerprint sensor 20 in a case where the finger 150 entirely covers the fingerprint sensor 20, corresponding to the state in FIG. 3. In FIG. 5, the horizontal axis indicates pixel numbers of the line sensor 20*a*, and the vertical line indicates output values of pixel data. The pixel number includes 0-125, indicating that the 63rd pixel is approximately located in a middle of the sensor. Further, unlike the case of FIG. 4, the predetermined pixels 22 to obtain a summation of deviations are uniformly arranged to locate with seven pixels apart each other from the 63rd pixel toward fewer numbers (to the left) and larger numbers (to the right). This configuration is assumed in the following description. Also, the output values of the pixel data range between 0-255.

As shown in FIG. 5, the pixel data of a fingerprint image collected with the line sensor 20*a* show larger values and smaller values corresponding to peaks and valleys of a fingerprint. When taking an average value of these pixel data, the average value is located approximately in a middle of the range of the peak values and the valley values in the pixel data. Therefore, differences between each pixel data of the fifteen pixels of the predetermined pixels 22 and the average pixel data, as indicated with vertical lines in FIG. 5, include large values. Thus, the summation of deviations obtained by the deviation adding unit 60 also indicates a large number, and the value of the summation of deviations is larger than a predetermined threshold value established by the finger contact detecting unit 70 (part of comparison and determination is not shown).

Figure 6:
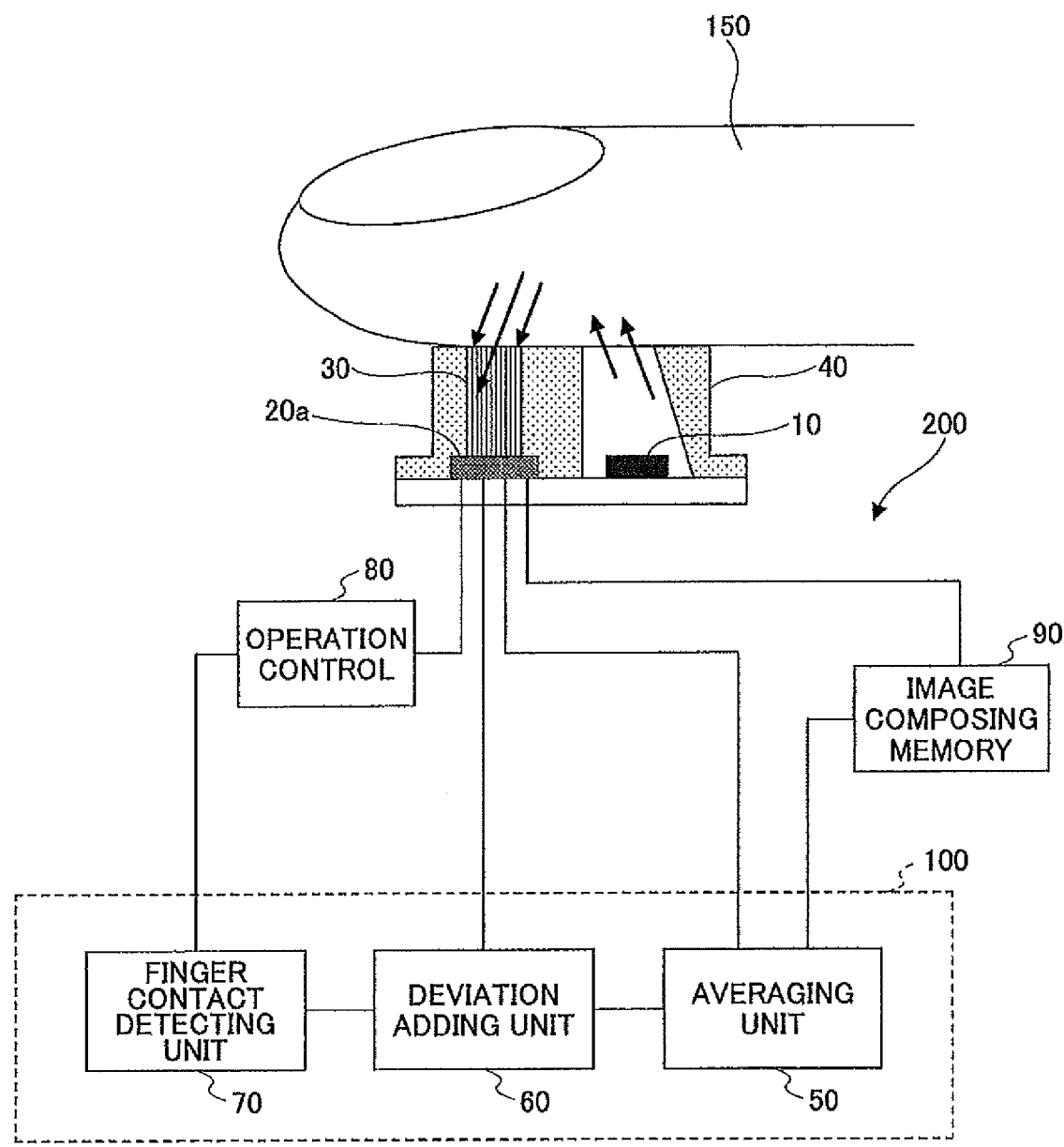
FIG. 6 is an illustration to show a state where the line sensor 20a collects a fingerprint image at a fingertip part.

FIG. 6 indicates that the finger 150 is swept toward the right side from the position shown in FIG. 6, showing that the line sensor 20*a* collects a fingerprint image at part of a fingertip of the finger 150. In a state shown in FIG. 6, the finger 150 is put on the line sensor 20*a* entirely covered with the finger 150. However, since the fingertip of the finger 150 is thinner than other parts of the finger 150, a small influence on background light occurs.

Figure 7:
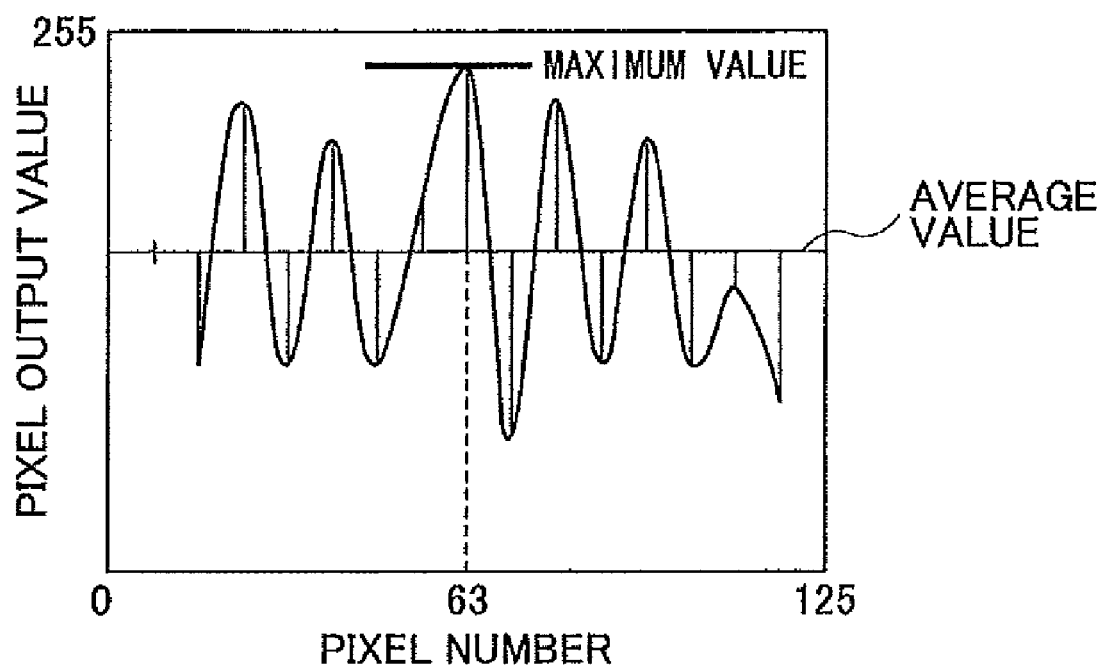
FIG. 7 is an illustration indicating output values of the pixels at the state of FIG. 6.

FIG. 7 shows pixel data output values when the part of the fingertip of the finger 150 is placed on the line sensor 20*a*, showing the state of FIG. 6. In FIG. 7, the whole pixel data indicate that the brightness slightly increase because of the background (disturbance or interfering) light caused by surrounding light, the whole output data values are higher than those of FIG. 5. Thus, the average pixel data obtained with the pixel data averaging unit (or averaging unit) 50 shows a higher value than that of FIG. 5. Also, the differences between the fifteen pixels of the predetermined pixels 22 and the average pixel data still show large values, although they are slightly smaller than those of FIG. 5 as indicated with vertical lines in FIG. 7. Accordingly, the summation of deviations obtained with the deviation adding unit 60 shows a reasonably large value which is larger than the predetermined threshold value established with the finger contact detecting unit 70.

Figure 8:
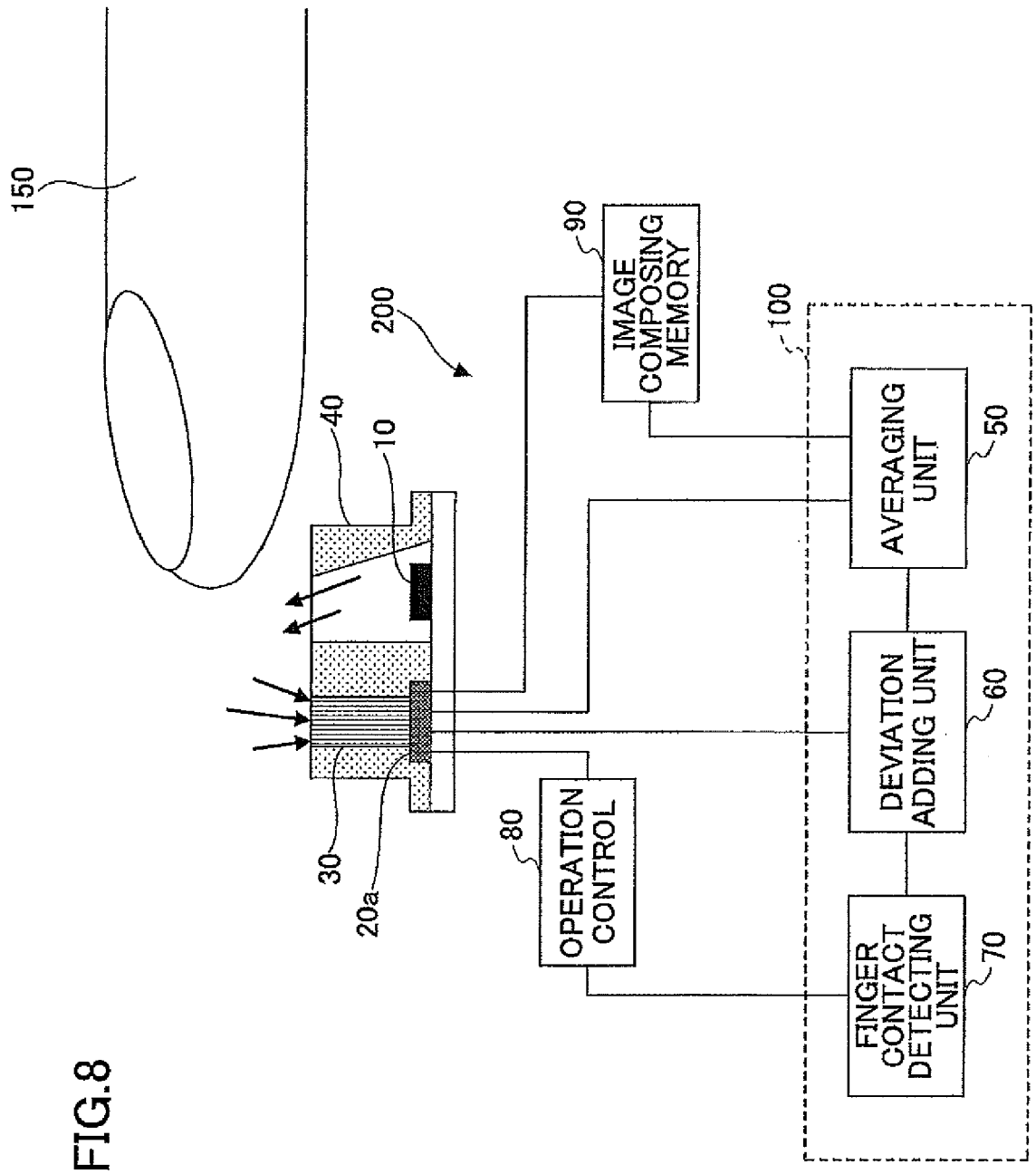

FIG. 8 shows a state where the finger 150 is further swept toward the right side from the state of FIG. 6 and the finger 150 is not placed on the line sensor 20*a*. For FIG. 8, the background light comes onto the line sensor 20*a* from the surroundings, and the line sensor 20*a* receives (detects) the background light instead of the incident light from the finger 150.

Figure 9:
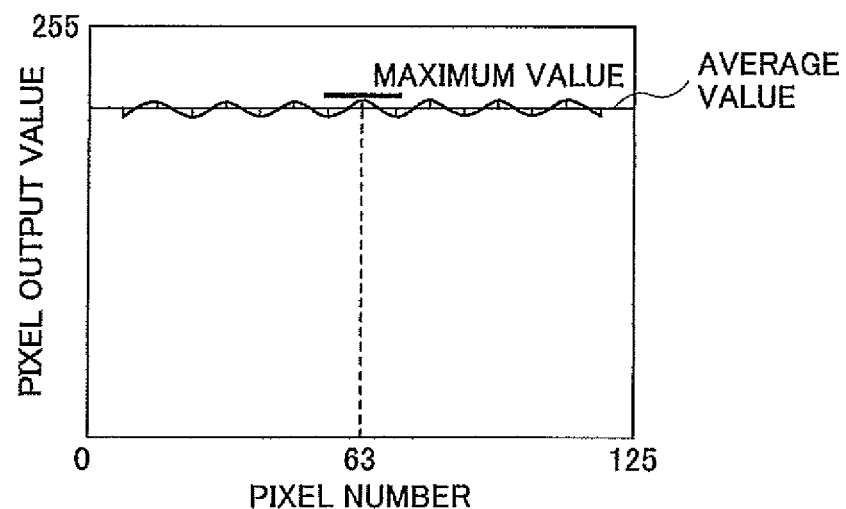
FIG. 9 indicates output data of the pixels at the state of FIG. 8.

FIG. 9 indicates pixel data output values, where the finger 150 is not on the line sensor 20*a* and the finger 150 is separated from the line sensor 20*a*, indicating the state of FIG. 8. For FIG. 9, the pixel data output values are approximately constant for the pixels 0-125. The pixel data output values depend on the intensity of the background (interference) light, so that the entire pixel data are large values when the background light intensity is relatively strong. In such case, the average pixel data obtained with the pixel data averaging unit 50 are also a high value. Further, the fifteen pixels of the predetermined pixels 22 on the line sensor 20*a* indicate approximately close values to the average value. As a result, the differences between each pixel datum and the average pixel data become small as indicated with each length of vertical lines of FIG. 9, and become smaller than those of the states of FIG. 5 and FIG. 7.

In this case, the summation of deviations calculated with the deviation adding unit 60 becomes a small value, and the value is smaller than the predetermined threshold value established by the finger contact detecting unit 70. For example, in FIG. 9, when the predetermined threshold value has been established to be 500, a value of the summation of deviations becomes definitely smaller than that value (500). In this case, it may be determined that the finger 150 is separated from the line sensor 20*a*. Further, when this state has continued for a predetermined number of lines or more, the determination (judgment) that the finger 150 is separated from the line sensor 20*a* may be made. For example, when a number of lines of the whole fingerprint image data correspond to be approximately 4000 (lines), approximately 5% of 4000 lines, 255 lines may be determined as the predetermined number of lines. As indicated in FIG. 9, when a state where the summation of deviations is smaller than the predetermined threshold value has continued for a predetermined number of lines or more, the determination (judgment) that the finger 150 is separated from the line sensor 20*a* may be made, and this method improves the correctness of the finger contact detecting and provides a highly reliable finger contact detecting apparatus 100 and a high reliable fingerprint reading apparatus 200.

Figure 10:
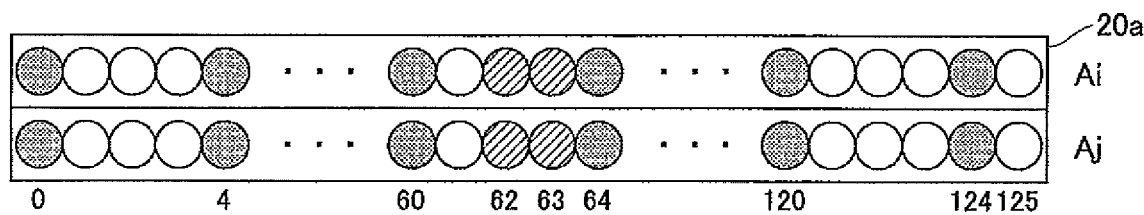
FIG. 10 is an illustration indicating pixels of the line sensor 20a to collect image data.

Next, referring to FIG. 10, a concrete calculation example executed in the finger contact detecting apparatus 100 is described. FIG. 10 is a drawing indicating pixel data collected with the line sensor 20*a* shown in FIG. 4 through FIG. 9.

In FIG. 10, the line sensor 20*a* is a fingerprint sensor 20 that includes 126 pixels of the pixels 21 arranged in a line having pixel numbers from 0 to 125, and the pixel data are formed by 126 of fingerprint image data. In FIG. 10, there are two data of pixels Ai and Aj.

Ideally, an average value of pixel data calculated with the averaging unit 50 is preferably obtained by using 126 of all pixel data for each line. However, from a point of a view for reducing load of data processing, averaging pixel data may be a simple method. For example, in FIG. 10, only two pixels 62nd and 63rd in 0-125 pixels located at a middle of the pixels 21 may be used to calculate the average value of the pixel data of a line.

In equations (1) and (2), such a simple method for averaging the pixel data is shown.

$$Ai=(Aj*15+(Pai+Pbi))/16 \quad (1)$$

$$Mi=Ai/2 \quad (2)$$

(for i=0, A0=Pa0+Pb0, j=i−1)

Ai: averaged pixel data of two pixels at the middle

Pai: one of the pixel data of two pixels at the middle (62th pixel)

Pbi: another one of the pixel data of two pixels at the middle (63th pixel)

Mi: averaged pixel data for one pixel

The equations (1) and (2) indicate that two pixel data of 62nd and 63rd pixels at the middle collected by the line sensor 20a are used to obtain weighted averages for vertical line and the weighted averages are used as average values of lines. The equation (1) indicates that an average pixel data of 16th line is obtained from 15th line data.

For the equation (1), assuming that an averaged value of two pixel data at the middle is Ai, one (62nd pixel) of two pixel data is Pai, another one (63rd) of two pixel data is Pbi, and j=i−1. Further, an added value Aj of two middle pixel data in jth line is multiplied by j to obtain the whole added pixel data Aj*j of the middle two pixels, and the result is added by the middle two pixel data (Pai+Pbi) of the ith line and the whole value is divided by i, as a result, an average value of the middle two pixel data in ith line is obtained based on the weighted average method. In the equation (1), i indicates the 16th line i=16 and j=15.

Further, from the equation (2), the value of Ai is divided by 2 to calculate an arithmetic average, so that an averaged one-pixel data value Mi is obtained. In short, the ith line's average pixel data value Mi can be obtained.

In this manner, instead of obtaining the whole pixel data values for each line, the number of pixels to be calculated may be reduced, or a pixel data average value per each line may be obtained using weighted average values in a vertical direction to the line. Further, in the present embodiment, average pixel data values of the line sensor 20a are obtained by using the two middle pixel data. However, another method of averaging for reduced number of pixels in one line or the like may be applied to average pixel data values.

Next, referring to FIG. 10, an example of calculating the summation of deviations performed by the deviation adding unit 60 is described. In FIG. 10, in the same as in FIG. 4, 32 of pixel data 21, 0, 4, . . . , 60, 64, . . . 4*k, . . . 120, 124 (k is zero or positive integers) are determined to calculate the summation of deviations. In this case, the equation for calculating the summation of deviations S can be written in equation (3).

$$S = \sum |M - Pk| \quad (3)$$

$$(0 \leq k < 32)$$

S: summation (addition) of deviations

Pk: pixel data of 4kth pixel

M: an average value of the line

As indicated in equation (3), assuming that the average of pixel data M, a pixel data value of the 4*k th pixel 22 being Pk, a summation S of a subtraction between the average of pixel data M and the pixel data value of the 4*k th pixel 22, the summation of deviation S shows an addition (a summation) of the absolute values of each difference of the average pixel data M and 32 of the pixel data values Pk. This calculation process is executed by the deviation adding unit 60.

Further, the summation of deviations S may be obtained by calculating squared addition of deviations $S^2$, and then obtaining its square root S to detect the finger contact using equation (4), instead of the absolute summation of deviations S, if this arithmetic process for obtaining the square root is simpler.

$$S = \sqrt{\sum (M - Pk)^2} \quad (4)$$

The predetermined threshold value to be used for judging finger contact performed with the finger contact detecting unit 70 is carried out by taking consideration of the pixel number of the pixels 22 predetermined by the deviation adding unit 60. In short, when the number of predetermined pixels to be used for calculating the summation (addition) of deviations is large, the predetermined threshold value becomes a large number according to the result of the addition. For example, when 32 pixels of the pixel 21 as the predetermined pixels 22 are selected, the corresponding predetermined threshold value may be set to be approximately 1000. Such values may be set for considering state according to the specification of the fingerprint sensor 20.

Further, a number of lines used to determine the finger contact detection may be set by a proper number that allows to collect the entire picture image of a fingerprint or that is suitable for the object of the use. For example, as described above, when 4000 lines are used to form the entire fingerprint image and approximately 5% of the number, e.g., 255 lines are established (used) for the finger contact detection, then the determination of finger contact (separating from the line sensor) may be made for a state where the summation of deviations S being less than the predetermined threshold value has continued for 255 lines. In this manner, by considering the number of lines for taking the entire fingerprint image or the sweeping speed of a finger, a proper number may be preset as the predetermined threshold value for the detecting of finger contact (separation).

Further, for a state where the summation of deviations S less than the predetermined threshold value has not continued for the predetermined number of lines occurs, the number of the lines counted may be initialized and the determination process may be started again, so that a more correct determination of finger contact can be performed.

Figure 11:
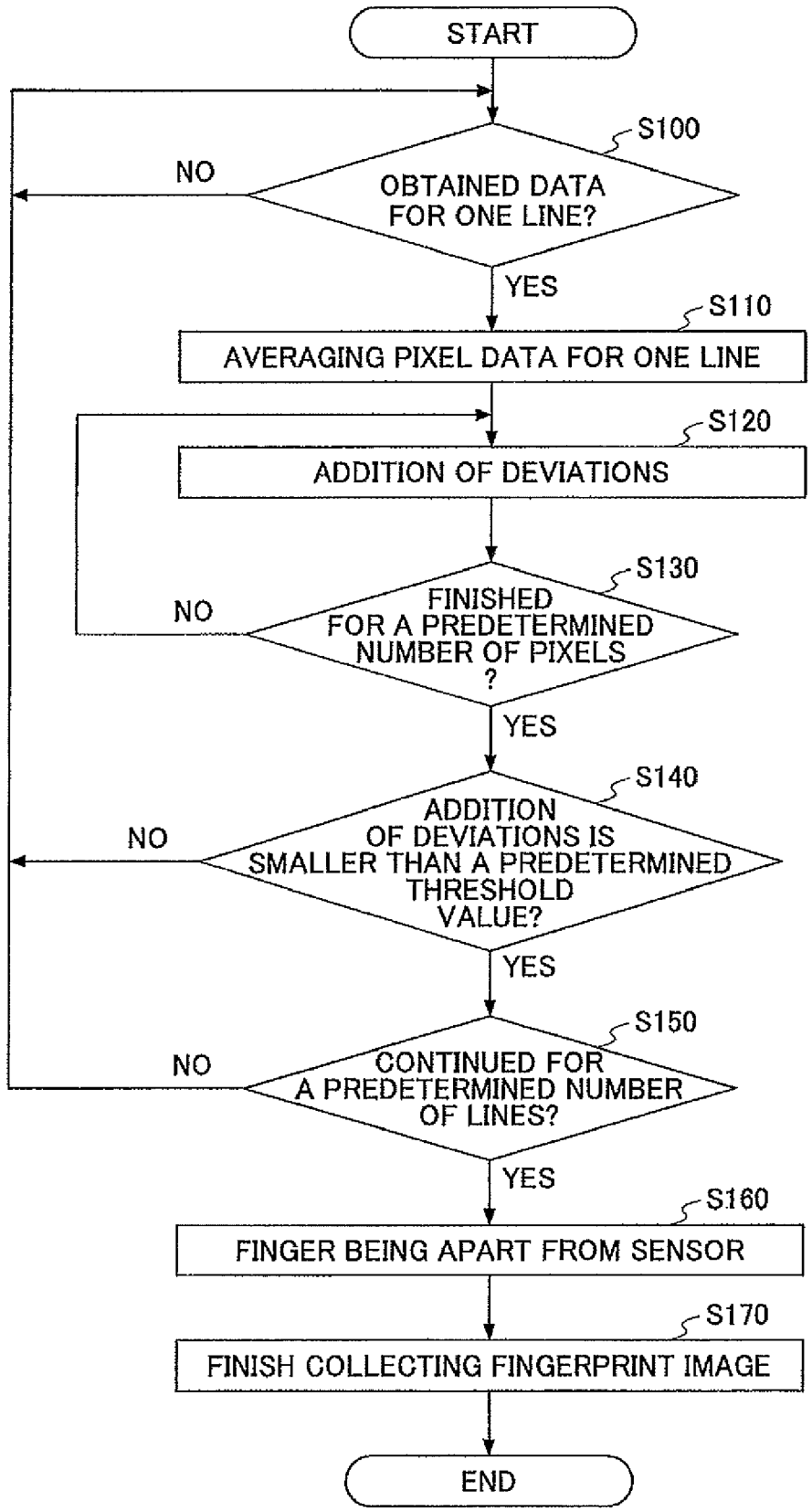
FIG. 11 is a flowchart to describe a process flow of a finger contact detecting method and a fingerprint reading method.

Next, referring to FIG. 10, a process flow performed in the finger contact detecting apparatus and the fingerprint reading apparatus is described. FIG. 11 shows a process flow of the finger contact detecting method and the fingerprint reading method.

In FIG. 11, at step 100, it is determined whether pixel data of one line is collected. Further, the fingerprint sensor may not be by a line sensor. Another type of sensor may be used. When a two-dimensional sensor is used, one line of the two-dimensional sensor may be used for detecting of the finger contact (separation), so that data processing can be simplified. In the present embodiment, a case where pixel data for one line are used for the detecting of the finger contact is described for an example. When a two-dimensional sensor is used, it may be assumed that the two-dimensional sensor includes a line sensor for the detecting of the finger contact (separation).

Judging whether pixel data of one line are collected may be carried out when the operation control unit 80 determines whether one frame data for one line have been collected, or when the image composing memory 90 determines whether new pixel data of one line have been collected. When one line pixel data collection is confirmed as being performed, the process advances to step 110, and if judged as not being performed, step 100 is repeated again.

At step 110, the averaging unit 50 calculates an average value of the one line pixel data. As a calculation method, an arithmetical average may be applied for the whole pixel data of the line of the fingerprint sensor 20, but when the data processing load is heavy, the calculation may carry out for reduced number of pixels. Also another arithmetic technique may be applied.

At step 120, the deviation adding unit 60 performs addition of each difference obtained between averaged pixel data and respective pixel data of the predetermined pixels, that is, the summation of deviations S is obtained. Based on the result, it can be determined whether a ridge pattern of a fingerprint exists on the fingerprint sensor 20. Further, the calculation step of the summation of deviations S may be carried out by applying equation (3), or equation (4), which calculates a square root of the square of the summation of deviations S.

At step 130, the process judges whether the summation of deviations S being performed at step 120 is completed for a predetermined number of pixels. For example, when 32 pixels are chosen from the predetermined pixels 22 for calculating S, and if calculating S has been performed for only 25 pixels, the process returns to step 120 and repeats calculating the summation of deviation S. Also, if the summation of deviation S has completed for the entire predetermined pixels, the process advances to step 140.

At step 140, the finger contact detecting unit 70 determines whether the summation of deviations S obtained through step 120 and step 130 is less than the predetermined threshold value. When the summation of deviations S is greater than the predetermined threshold value, indicating that the output data values of pixels have a wide range between the maximum value and the minimum value and thus a lot of pixel data having differences between each pixel data value and an average value of pixel data exist. This indicates that the process determines that the possibility of having a finger on the line sensor 20, showing a roughness pattern, is high. In this case, the process returns to step 100 and performs judging whether one line pixel data are collected and repeats the same step described above.

On the other hand, when the summation of deviations S is less than the predetermined threshold value, it is determined that the finger 150 is separated from the finger sensor 20, and the process advances to step 150.

At step 150, the finger contact detecting unit 70 determines whether a state where the summation (addition) of deviations S at step 140 is less than the predetermined threshold value has continued for a predetermined number of lines. Thereby, the mistaken detection of finger contact can be reduced and reliable determination whether the finger 150 is separated from the fingerprint sensor 20 becomes possible. For a case where the summation of deviations S is less than the predetermined threshold value has continued for more than the predetermined number of lines, the process returns to step 100 and the process starts from the beginning of the process flow and repeats the same steps.

On the other hand, for a state where the summation of deviations S is smaller than the predetermined threshold value has continued for more than the predetermined number of lines, the process determines that the finger 150 is separated from the fingerprint sensor 20 (determination of finger separation). The process of the finger contact detecting apparatus 100 and the finger contact detecting method is finished with the above step, but for the case of the fingerprint reading apparatus 200 or the fingerprint reading method, the process advances to step 170.

At step 170, the operation control unit 80 performs a termination process of fingerprint image reading (collection) by using the fingerprint sensor 20. By this step, operations of the light-emitting unit 10 and the fingerprint sensor 20 are finished, and when necessary, their power may be turned off for energy saving.

Further, for the finger contact detecting method, step 150 is not a required step, so the process step 150 may be performed for more certain detecting of finger contact when necessary.

As described above, by applying the finger contact detecting unit 100, the finger contact detecting method, the fingerprint reading apparatus 200 using the method, and the fingerprint reading method relating to the present embodiments, the detecting of finger contact can be performed and the mistaken detection can be reduced even under radiation of background light. As a result, a case where part of a fingerprint image at the fingertip is lost can be avoided.

Further, the finger contact detecting unit 100, the finger contact detecting method, the fingerprint reading apparatus 200 using the method, and the fingerprint reading method related to the present embodiments may be applicable for a pointing device, and such pointing device can collect the information of the finger 150 which is moving even under radiation from background light.

The preferred embodiments of this invention have been described above. The present invention is not limited to the specifically disclosed embodiments, and variations and modifications may be made without departing from the scope of the present invention.

The present application is based on Japanese priority application No. 2007-250475 filed Sep. 27, 2007, the entire contents of which are hereby incorporated herein by reference.

What is claimed is:

1. A finger contact detecting apparatus which detects a finger being swept on a fingerprint sensor,
    the finger contact detecting apparatus comprising:
    a pixel data averaging unit configured to calculate an average value of pixel data collected by the fingerprint sensor;
    a deviation adding unit configured to calculate, based on the average value and respective pixel data of predetermined pixels obtained by the fingerprint sensor, a summation of deviations of the respective pixel data of the predetermined pixels; and
    a finger contact detecting unit configured to determine whether the finger is separated from the fingerprint sensor based on the summation of deviations and a predetermined threshold value, wherein
    the fingerprint sensor includes a line sensor provided with plural pixels arranged in a line shape, the finger contact detecting unit is configured to compare the summation of deviations and the predetermined threshold value, and when a state where the summation of deviations is less than the predetermined threshold value continues for more than a predetermined number of lines, the finger contact detecting unit is configured to determine that the finger is separated from the line sensor.

2. The finger contact detecting apparatus as claimed in claim 1, wherein the predetermined pixels include plural pixels arranged with a uniform separation on the line sensor.

3. A fingerprint reading apparatus comprising:
the finger contact detecting apparatus claimed in claim 1;
the fingerprint sensor; and
an image composing memory configured to record fingerprint image data collected by the fingerprint sensor and composes a fingerprint image.

4. A finger contact detecting method comprising:
collecting pixel data of a fingerprint sensor while a finger is being swept on the fingerprint sensor;
calculating an average value of the pixel data collected by the fingerprint sensor;
calculating a summation of deviations based on the average value and respective pixel data of predetermined pixels obtained by the fingerprint sensor; and
determining whether the finger is separated from the fingerprint sensor based on the calculated summation of deviations and a predetermined threshold value, wherein
the fingerprint sensor includes a line sensor provided with plural pixels arranged in a line shape, the determining compares the summation of deviations and the predetermined threshold value, and when a state where the summation of deviations is less than the predetermined threshold value continues for more than a predetermined number of lines, the determining determines that the finger is separated from the line sensor.

5. The finger contact detecting method as claimed in claim 4, wherein the predetermined pixels includes plural pixels arranged with a uniform separation on the line sensor.

6. A non-transitory computer-readable recording medium having instructions executable by a computer to execute a fingerprint reading method comprising:
collecting fingerprint image data while a finger is being swept on a fingerprint sensor; and
performing the finger contact detecting method of claim 4, wherein when the finger is detected as being separated from the fingerprint sensor after performing the finger contact detecting method, the collecting fingerprint image data is terminated.

* * * * *